US009097893B2

(12) United States Patent
Murakami (10) Patent No.: US 9,097,893 B2
(45) Date of Patent: Aug. 4, 2015

(54) INFORMATION PROCESSING TERMINAL FOR SUPERIMPOSING TARGET POSITION ON A HEAD MOUNTED DISPLAY

(71) Applicant: Nobuyuki Murakami, Tokyo (JP)

(72) Inventor: Nobuyuki Murakami, Tokyo (JP)

(73) Assignee: Imagenics Co., LTD, Tokyo (JP)

( * ) Notice: Subject to any disclaimer, the term of this patent is extended or adjusted under 35 U.S.C. 154(b) by 0 days.

(21) Appl. No.: 14/190,809

(22) Filed: Feb. 26, 2014

(65) Prior Publication Data

US 2014/0240347 A1 Aug. 28, 2014

(30) Foreign Application Priority Data

Feb. 27, 2013 (JP) .................................. 2013-37347

(51) Int. Cl.
*G06T 19/00* (2011.01)
*G02B 27/01* (2006.01)
*G06F 3/01* (2006.01)

(52) U.S. Cl.
CPC .............. *G02B 27/017* (2013.01); *G06F 3/011* (2013.01); *G02B 2027/014* (2013.01); *G02B 2027/0138* (2013.01); *G02B 2027/0141* (2013.01)

(58) Field of Classification Search
CPC .................................................... G06T 19/006
USPC ........................................................ 345/629
See application file for complete search history.

(56) References Cited

U.S. PATENT DOCUMENTS

| 8,427,508 | B2 * | 4/2013 | Mattila et al. .................. 345/634 |
| 8,823,513 | B2 * | 9/2014 | Jameson et al. .......... 340/539.13 |
| 2012/0075341 | A1 * | 3/2012 | Sandberg ........................ 345/633 |
| 2012/0092369 | A1 * | 4/2012 | Kim et al. ....................... 345/633 |

FOREIGN PATENT DOCUMENTS

| JP | 2003-121162 A | | 4/2003 |
| JP | 2005-227208 A | | 8/2005 |
| JP | 2007-208414 A | | 1/2006 |
| JP | 2008-191102 A | | 8/2008 |
| JP | 2008191102 A | * | 8/2008 |
| JP | 2010-048616 A | | 3/2010 |
| JP | 2010048616 A | * | 3/2010 |
| JP | 4508031 B2 | | 7/2010 |

* cited by examiner

*Primary Examiner* — David Zarka
*Assistant Examiner* — Shivang Patel
(74) *Attorney, Agent, or Firm* — Whitham, Curtis Christofferson & Cook, P.C.

(57) ABSTRACT

An information processing terminal includes a distance and direction acquirer that acquires a distance and a direction to a target terminal; a displayed-position identifier that identifies a displayed position indicating the current position of the target terminal on the display unit with reference to the distance and the direction; and a superposing unit that displays the current position at the identified displayed position, the displayed-position identifier acquiring a second distance to a general object in the see-through image and a second direction to the general object and identifying the displayed position with reference to the second distance and the second direction.

11 Claims, 12 Drawing Sheets

INFORMATION PROCESSING TERMINAL FOR SUPERIMPOSING TARGET POSITION ON A HEAD MOUNTED DISPLAY

BACKGROUND OF THE INVENTION

1. Technical Field

The present invention relates to an information processing terminal that superposes positional information on a target terminal on a see-through image appearing on a display unit of a see-through head-mounted display, a method of processing information carried out by the information processing terminal, and a program to be executed by the information processing terminal for processing information.

2. Background Art

Various technologies are known for portable information terminals that assist searches in crowds or warrens for a person of interest.

A known technique for assisting a search determines the position of a target that is captured in an image on the basis of the direction of the image capturing, the current position of the portable information terminal, the angular field of the captured image, and the positional information on the target, and superposes the determined position of the target on the captured image (for example, refer to Japanese Patent No. 4508031).

Another known technique for assisting a search displays an image on a base unit by superposing the positional information on an extension unit on an image of the view in a reference direction through the application of information on the position and direction of the base unit and information on the position of the extension unit (for example, refer to Japanese Patent Application Laid-Open No. 2007-208414).

Another technique is also known for guiding a user to a target through the use of a head-up display or a head-mounted display (for example, refer to Japanese Patent Application Laid-Open No. 2005-227208).

The technology disclosed in Japanese Patent Application Laid-Open No. 2005-227208 provides a direction to a target with arrows appearing on a head-up display or a head-mounted display and indicates the distance to the target, for example, by varying the size of the arrows.

SUMMARY OF THE INVENTION

Technical Problem

The techniques described above assist the search for targets with see-through head-mounted displays, for example, to superpose images on a view of the real world. This allows a searcher to readily find a target.

The techniques described above, however, do not describe specific means for displaying images appearing on a screen of a see-through head-mounted display on the basis of the positional information on a target terminal acquired by an information processing terminal carried by a searcher who wants to find a target terminal.

An object of the present invention is to provide an information processing terminal that can assist a search through a see-through image appearing on a display screen of a see-through head-mounted display for a target terminal.

An information processing terminal according to the present invention displays a position of a target terminal superposed on a see-through image displayed on a display unit of a see-through head-mounted display, the information processing terminal including a distance acquirer that acquires a first distance to the target terminal; a direction acquirer that acquires a first direction to the target terminal; a displayed-position identifier that identifies a displayed position indicating the current position of the target terminal on the display unit with reference to the first distance and the first direction; and a superposing unit that displays the current position at the identified displayed position, the displayed-position identifier acquiring a second distance to a general object in the see-through image and a second direction to the general object and identifying the displayed position with reference to the second distance and the second direction.

According to the present invention, an information processing terminal is configured to assist a search using a see-through image appearing on a display screen of a see-through head-mounted display for a target terminal.

DESCRIPTION OF THE PREFERRED EMBODIMENTS

An information processing terminal, a method of processing information, and a program for information processing according to the present invention will now be described with reference to the accompanying drawings. A search for a target (for example, father's lost son) by a searcher (for example, a father) will be described.

Figure 1:
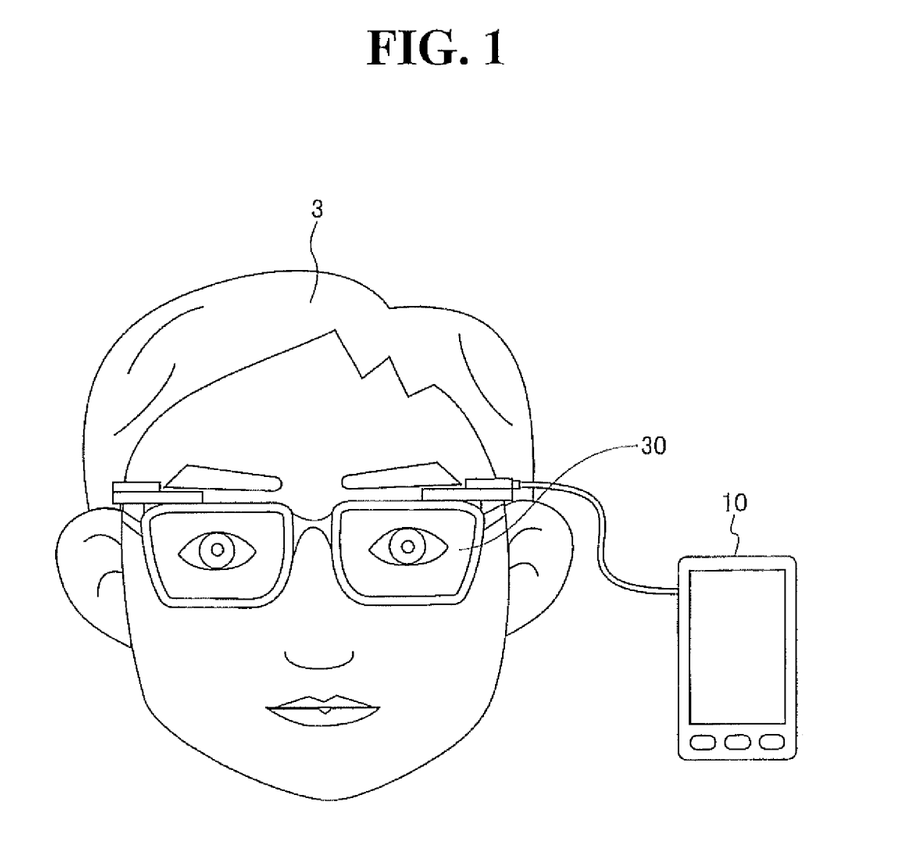
FIG. 1 is a schematic view of an information processing terminal according to an embodiment of the present invention.

FIG. 1 is a schematic view of a searcher using an information processing terminal and a see-through head-mounted display according to the present invention. As illustrated in the drawing, the information processing terminal 10 is electrically connected to a see-through head-mounted display (HMD) 30 worn by the searcher 3.

The information processing terminal 10 is an information processing device that can directly or indirectly communicate with a target terminal 20, such as a smart phone or a mobile phone.

The HMD 30 can be worn by the searcher 3 such that a display unit is located in front of the eyes of the searcher 3, as illustrated in FIG. 1. The HMD 30 can superpose an image received from the information processing terminal 10 on a see-through image of the real world appearing on the display unit.

The information processing terminal 10 and the HMD 30 may be connected via a wire, as illustrated in FIG. 1, or may be connected wirelessly.

Figure 2:
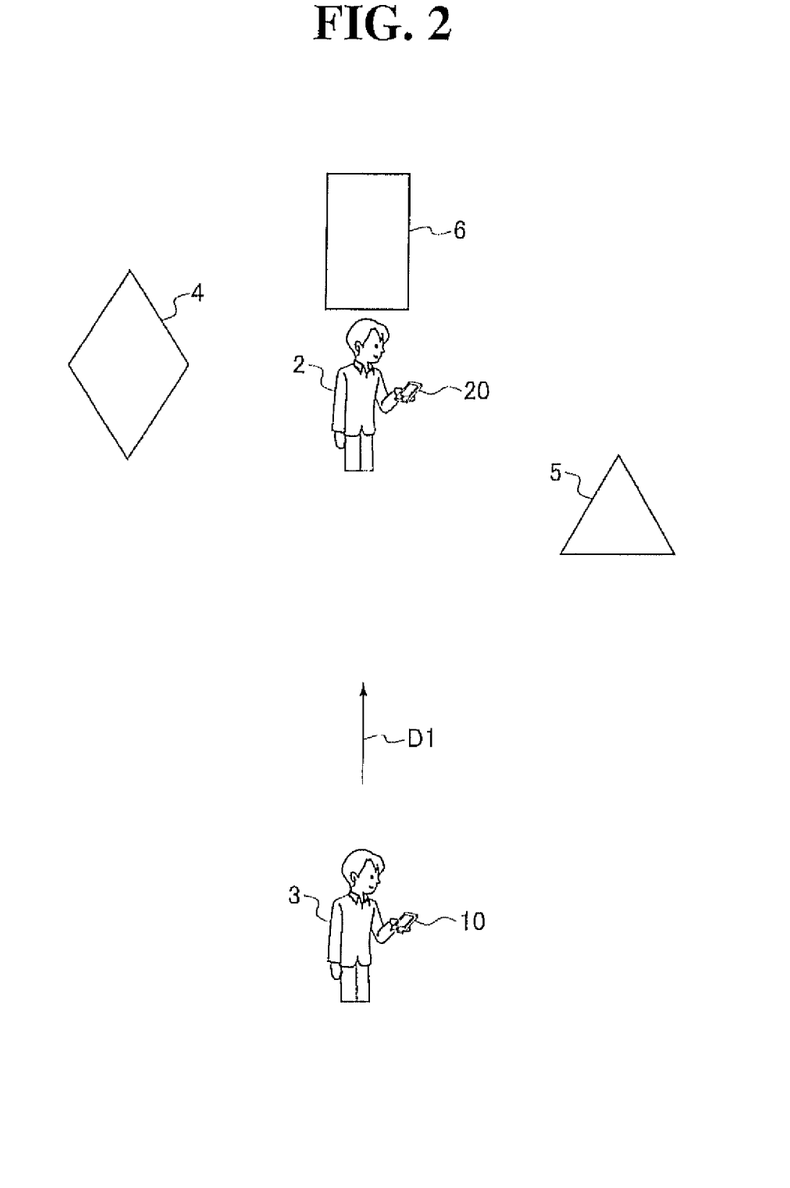
FIG. 2 is a schematic view of an exemplary search carried out by the information processing terminal.

FIG. 2 is a schematic view of an exemplary search carried out by the information processing terminal 10. As illustrated in the drawing, the information processing terminal 10 displays the current position of the target 2 on the display unit of the HMD 30 to assist the search for the target 2, which is located in a direction D1 from the information processing terminal 10.

The target 2 carries the target terminal 20. The target terminal 20 is an information processing device, such as a smart phone or a mobile phone, and can directly or indirectly connect to the information processing terminal 10. The target 2 is surrounded by general objects 4 and 5 and a specific object 6.

The general objects 4 and 5 are visible from the searcher 3 in directions different from those of the target 2. The specific object 6 is visible from the searcher 3 in the same or substantially same direction as that of the target 2. The specific object 6 is further from the searcher 3 than the target 2.

The objects 4 and 5 and the specific object 6, for example, are buildings, vehicles, or persons other than the target 2 not carrying the target terminal 20. The persons other than the target 2 and the objects around the target 2 are obstacles to the visual detection of the target 2 by the searcher 3.

Figure 3:
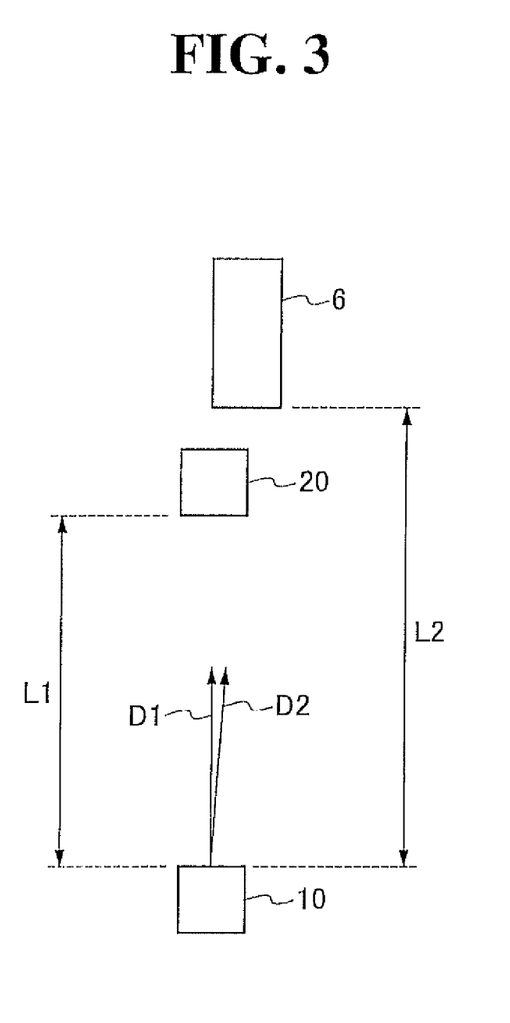
FIG. 3 illustrates the relationships of the distance and direction between a target terminal and the information processing terminal.

FIG. 3 illustrates the relationships of the distance and direction between the information processing terminal 10 and the target terminal 20 and between the information processing terminal 10 and the specific object 6. The target 2 is detected by the searcher 3 with the information processing terminal 10 with reference to the distance L1 from the information processing terminal 10 to the target terminal 20 and the direction D1 from the information processing terminal 10 to the target terminal 20.

Alternatively, the target 2 can be detected by the searcher 3 with the information processing terminal 10 through the detection of the specific object 6 as a target with reference to the distance L2 from the information processing terminal 10 to the specific object 6 and the direction D2 from the information processing terminal 10 to the specific object 6.

Figure 4:
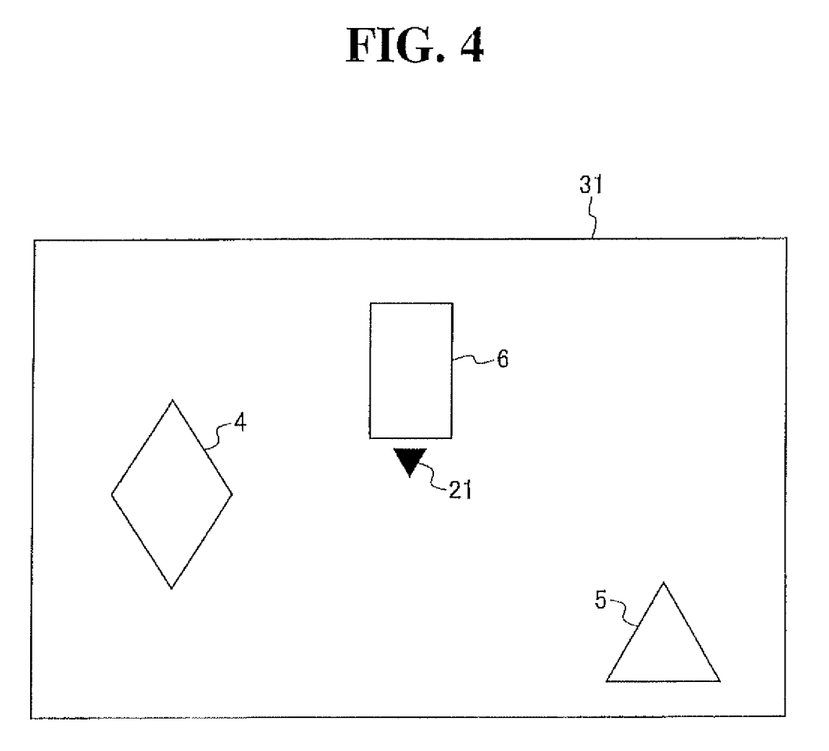
FIG. 4 is a schematic view of an exemplary image displayed on a display unit of a see-through head-mounted display.
Figure 5:
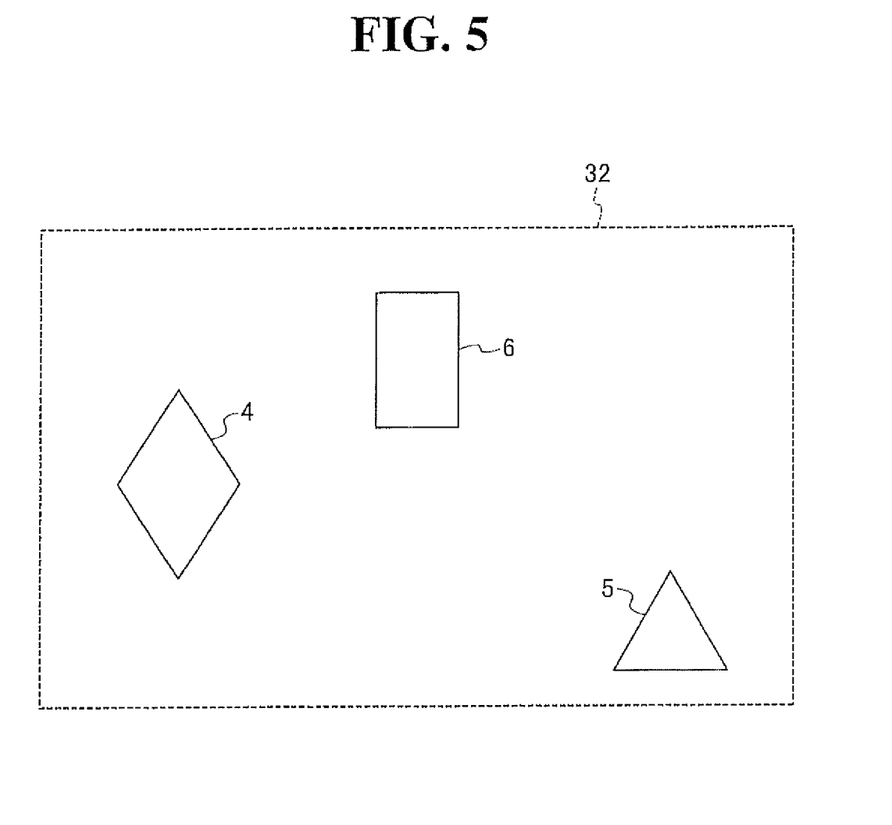
FIG. 5 is schematic view of an exemplary displayed see-through image.
Figure 6:
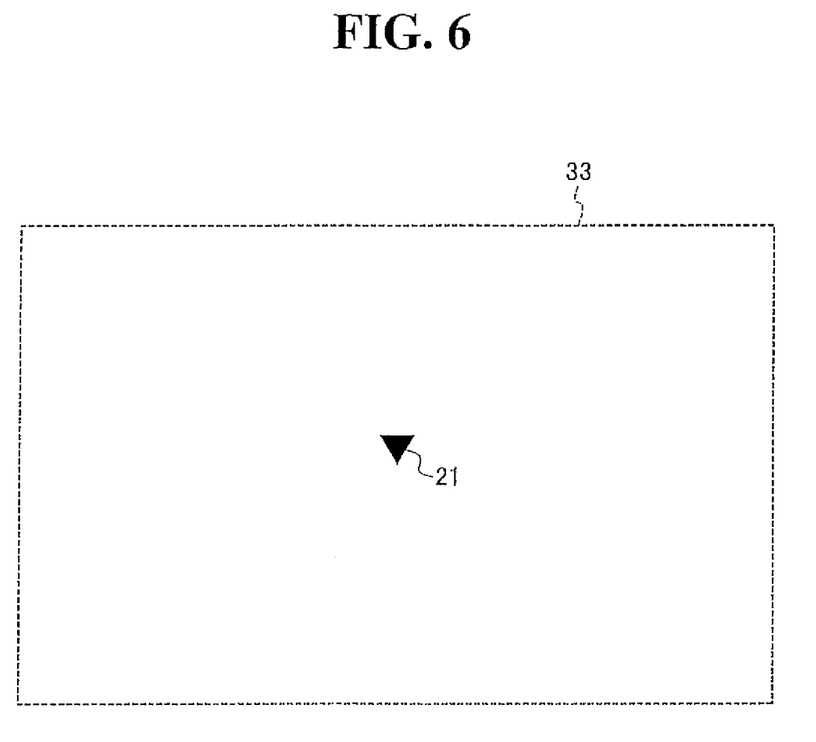
FIG. 6 is a schematic view of an exemplary displayed current-position image.

FIG. 4 is a schematic view of an exemplary image displayed on the display unit of the HMD 30. FIG. 5 is schematic view of a displayed see-through image 32. FIG. 6 is a schematic view of a displayed current-position image 33.

As illustrated in FIG. 4, the display unit 31 of the HMD 30 displays the current-position image 33, which is generated by the information processing terminal 10 and illustrated in FIG. 6, superposed on the see-through image 32, which is illustrated in FIG. 5.

The see-through image 32 includes the general objects 4 and 5 and the specific object 6. That is, the general objects 4 and 5 and the specific object 6 are in the view of the searcher 3. The current-position image 33 includes the current position 21 of the target terminal 20.

Figure 7:
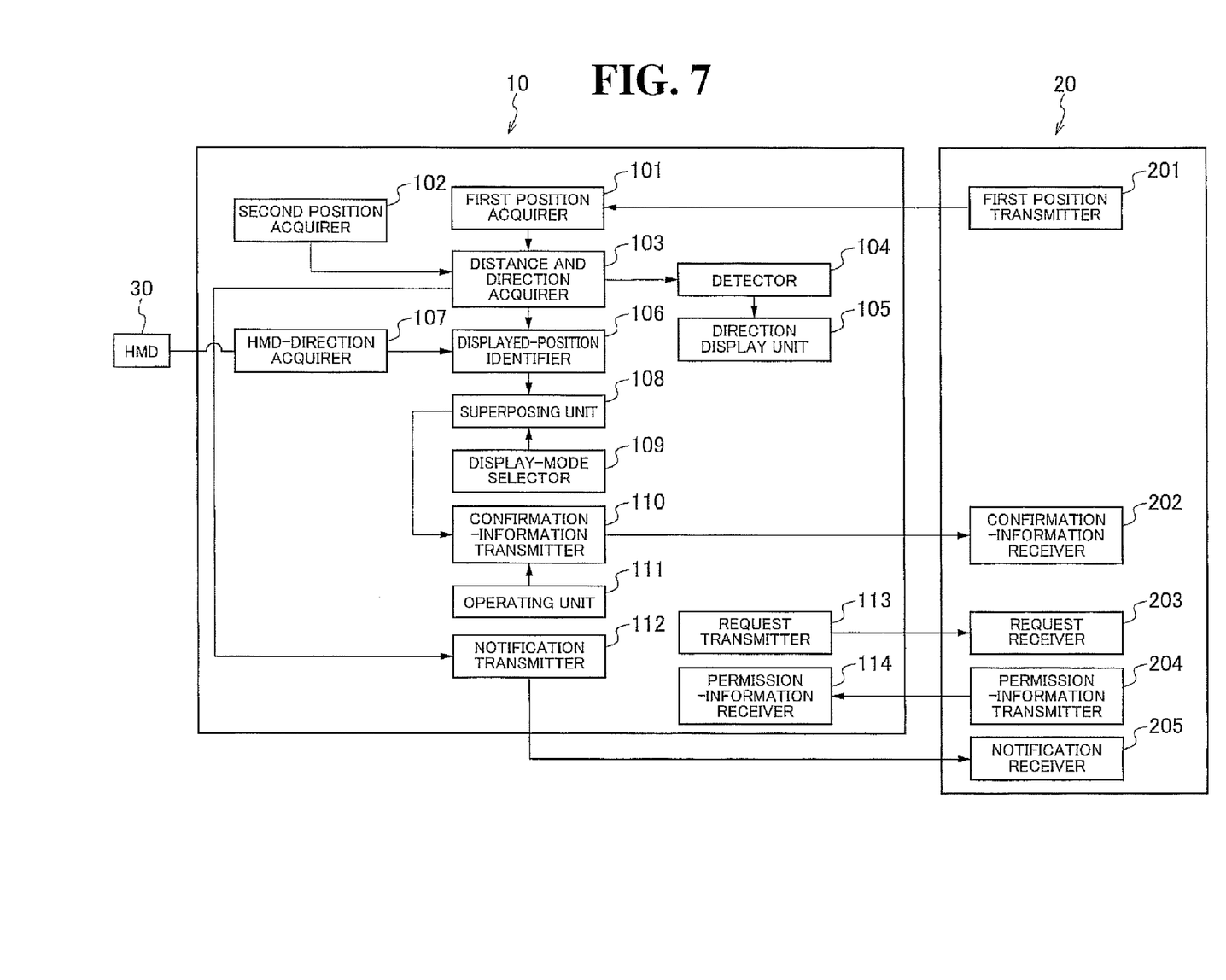
FIG. 7 is a block diagram illustrating the configurations of the information processing terminal and the target terminal.

FIG. 7 is a block diagram illustrating the configurations of the information processing terminal 10 and the target terminal 20. As illustrated in the drawing, the information processing terminal 10 includes a first position acquirer 101, a second position acquirer 102, a distance and direction acquirer 103, a determiner 104, a direction display unit 105, a displayed-position identifier 106, an HMD-direction acquirer 107, a superposing unit 108, and a display-mode selector 109.

The information processing terminal 10 includes a confirmation-information transmitter 110, an operating unit 111, a notification transmitter 112, a request transmitter 113, and a permission-information receiver 114.

As illustrated in FIG. 7, the target terminal 20 includes a first position transmitter 201, a confirmation-information receiver 202, a request receiver 203, a permission-information transmitter 204, and a notification receiver 205.

The information processing terminal 10, which has the configuration described above, carries out a method of processing information according to the present invention to superpose the current-position image 33 indicating the position of the target terminal 20 on the see-through image 32 appearing on the display unit 31 of the HMD 30.

The information processing terminal 10 in the method of processing information according to the present invention acquires the distance L1 and direction D1 to the target terminal 20 to determine the current position 21 on the display unit 31 on the basis of the distance L1 and the direction D1. The information processing terminal 10 then displays the current-position image 33 including the current position 21 superposed on the see-through image 32.

A computer other than the information processing terminal 10 may carry out the method of processing information and function as the information processing terminal 10.

The first position acquirer 101 receives the current position of the target terminal 20 from the first position transmitter 201.

The current position of the target terminal 20 received by the first position acquirer 101 is information acquired by a global positioning system (GPS) provided for the target terminal 20. Alternatively, the first position acquirer 101 may acquires the current position of the target terminal 20 from a server (not shown) collecting information on the current position of the target terminal 20.

The second position acquirer 102 acquires a second distance L2 to the specific object 6 included in the see-through image 32 and a second direction D2 to the target terminal 20. If multiple general objects are included in the see-through image 32, the second position acquirer 102 selects a specific object 6 from the multiple general objects in the see-through image 32 and determines the second distance L2 and the second direction D2, as described below.

The distance and direction acquirer 103 determines the distance L1 and direction D1 to the target terminal 20 on the basis of the positional information on the information processing terminal 10 and the positional information on the target terminal 20. The distance and direction acquirer 103 corresponds to a distance acquirer and a direction acquirer according to the present invention.

The distance and direction acquirer 103 determines the distance L1 from the information processing terminal 10 to the target terminal 20 on the basis of the positional information on the target terminal 20 and the positional information on the information processing terminal 10. The distance and direction acquirer 103 determines the direction D1 from the information processing terminal 10 to the target terminal 20 on the basis of the positional information on the target terminal 20 and the positional information on the information processing terminal 10.

The detector 104 detects the target terminal 20 in the see-through image 32 appearing on the display unit 31 with reference to the direction D1 acquired by the first position acquirer 101 and the second direction D2 acquired by the second position acquirer 102.

If the detector 104 does not detect the target terminal 20 in the see-through image 32, the direction display unit 105 displays the direction to the target terminal 20 on the display screen 31 with reference to the directions D1 and D2 to the target terminal 20. The direction to the target terminal 20 may appear on the display unit 31 as an arrow or highlight.

The displayed-position identifier 106 identifies the current position 21 of the target terminal 20 on the display unit 31 with reference to the distances L1 and L2 and the directions D1 and D2.

That is, the displayed-position identifier 106 selects the specific object 6 among the multiple general objects included in the see-through image 32 with reference to at least one of the distance L1 and the direction D1 to the target terminal 20. The displayed-position identifier 106 calculates the second distance L2 and the second direction D2 to the selected specific object 6.

The displayed-position identifier 106 can calculate the second distance L2 through known triangulation (ranging with a stereo camera) using images captured with two cameras provided on the HMD 30. Alternatively, the displayed-position identifier 106 may calculate the second distance L2 through the ranging function by autofocusing of a camera.

The displayed-position identifier 106, for example, calculates the second direction D2 with reference to the current direction of the HMD 30 determined by the HMD-direction acquirer 107, as described below, and the position of the specific object 6 on the display unit 31.

For example, if the HMD 30 faces north and the specific object 6 appears in the middle of the display unit 31 in the horizontal direction, the second direction D2 is defined as "north." That is, the displayed-position identifier 106 calculates the second direction D2 on the basis of the difference among the direction of the HMD 30, the center of the display unit 31, and the position of the specific object 6 appearing on the display unit 31.

The displayed-position identifier 106 identifies the current position 21 of the specific object 6 on the display unit 31 with reference to the calculated second distance L2 and second direction D2.

The HMD-direction acquirer 107 determines the current direction of the HMD 30, i.e., the direction of the line of sight of the searcher 3. The HMD-direction acquirer 107 determines the current direction of the HMD 30, for example, with an electronic compass equipped with a magnetic sensor that detects weak geomagnetism.

The superposing unit 108 displays the current position 21 at the identified position. The superposing unit 108 highlights the specific object 6 that appears at the identified position among the other multiple objects included in the see-through image 32.

The display-mode selector 109 changes the display made of the current position 21 appearing on the display unit 31.

If the distance from the information processing terminal 10 to the target terminal 20 changes during display of the current position 21 on the display unit 31, the display-mode selector 109 changes the display mode in response to the change in distance.

The display-mode selector 109 changes the display mode of the current position 21 appearing on the display unit 31 upon reception of permission information from the target terminal 20 by the permission-information receiver 114.

Upon display of the current position 21 on the display unit 31, the confirmation-information transmitter 110 sends confirmation information to the target terminal 20.

The confirmation-information transmitter 110 sends confirmation information to the target terminal 20 in response to the operation of the operating unit 111.

The operating unit 111, which is a button or a switch, is operated by the searcher 3, who is the user.

The notification transmitter 112 sends a notification to the target terminal 20 based on the distance L1 from the information processing terminal 10 to the target terminal 20 determined by the distance and direction acquirer 103. The notification transmitter 112 sends a notification to the notification receiver 205 only if the distance L1 from the information processing terminal 10 to the target terminal 20 is smaller than a predetermined value, which, for example, is a value stored in advance in a storage unit of the information processing terminal 10.

The notification is information on the decrease in the distance between the information processing terminal 10 and the target terminal 20 to the predetermined value or less.

The request transmitter 113 sends a request for the transmission of the position of the target terminal 20 to the target terminal 20.

The request transmitter 113 may send a request to the target terminal 20 only if the permission-information receiver 114 receives permission information.

The permission-information receiver 114 receives permission information from the target terminal 20 in response to a predetermined operation of the target terminal 20, such as the pressing a specific button, after reception of the confirmation information. The confirmation information is sent to the target on the detection of the target by the searcher.

The first position transmitter 201 sends the current position of the target terminal 20 to the first position acquirer 101.

The confirmation-information receiver 202 receives confirmation information from the confirmation-information transmitter 110.

The request receiver 203 receives a request for the transmission of the position of the target terminal 20 sent from the request transmitter 113.

The permission-information transmitter 204 sends permission information to the permission-information receiver 114 in response to a predetermined operation of the target terminal 20, such as pressing a specific button, after reception of the confirmation information.

The notification receiver 205 receives a notification from the notification transmitter 112, on the basis of the distance L1 from the information processing terminal 10 to the target terminal 20.

Figure 8:
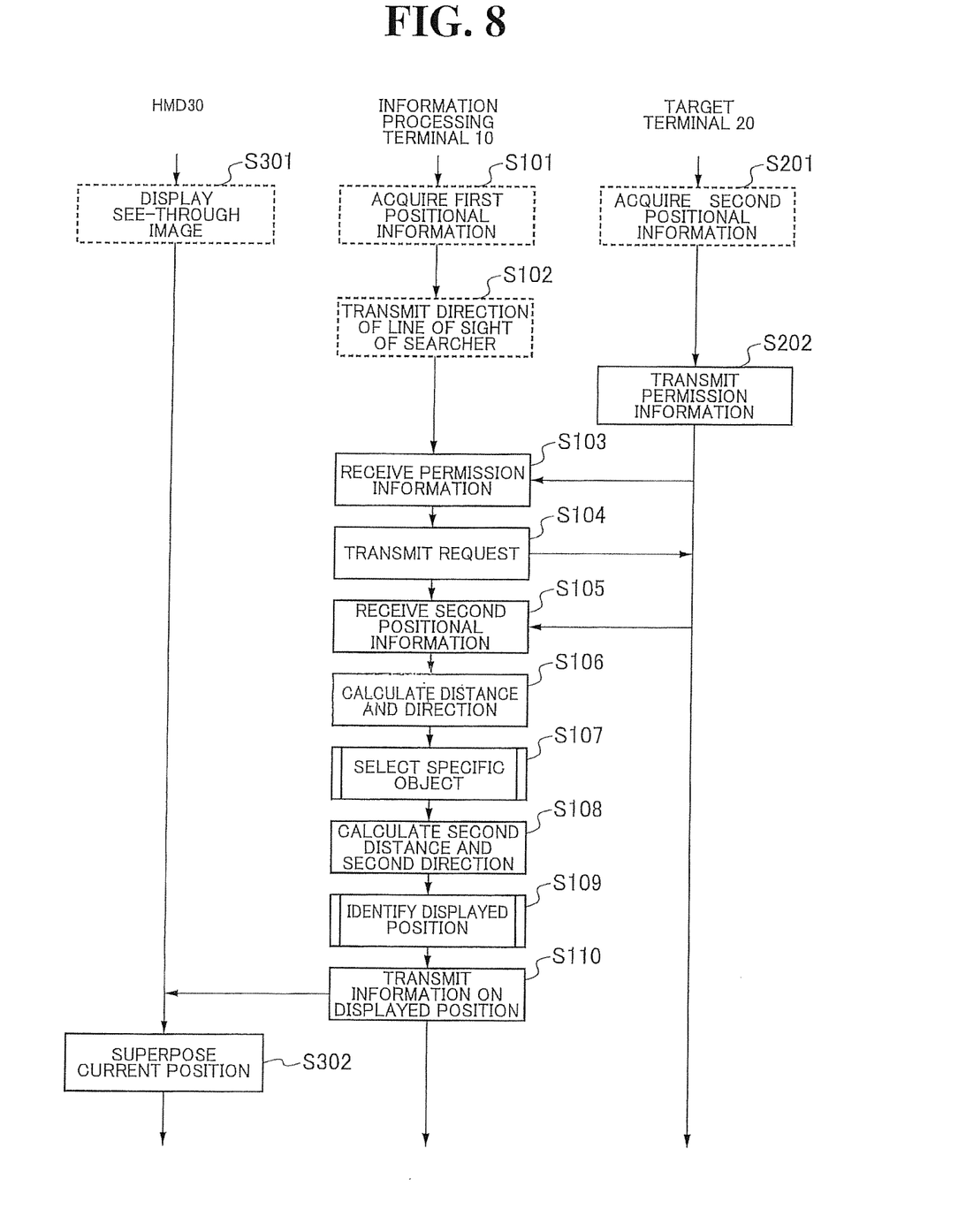
FIG. 8 is a sequence diagram illustrating a method of processing information according to an embodiment of the present invention.

FIG. 8 is a sequence diagram illustrating a method of processing information according to the present invention. The procedures carried out in the information processing terminal 10, the target terminal 20, and the HMD 30 in the method of processing information according to the present invention will now be described with reference to the drawing.

Upon start of the method of processing information according to the present invention, the second position acquirer 102 acquires first positional information (S101). For example, the searcher 3 activates a computer program in the information processing terminal 10 to start the method of processing information.

The HMD 30 continues to display the see-through image 32 on the display unit 31 (S301).

The target terminal 20 continues to acquire second positional information, which is the positional information on the target terminal 20 (S201).

After the acquisition of the first positional information, the information processing terminal 10 transmits the direction of the line of sight of the searcher 3 (S102).

The target 2 operates the target terminal 20 to authorize the transmission of permission information to the information processing terminal 10 (S202). For example, the target 2 carries out a specific operation at the target terminal 20 when the target 2 wants to be found by the searcher 3. The permission information permits the searcher 3 to search for the target 2.

The permission-information receiver 114 receives the permission information from the permission-information transmitter 204 of the target terminal 20 (S103).

The request transmitter 113 transmits a request for the transmission of the positional information on the target terminal 20 to the target terminal 20 (S104).

The second position acquirer 102 receives the second positional information from the target terminal 20 (S105).

The distance and direction acquirer 103 acquires the distance from the information processing terminal 10 to the target terminal 20 and the direction from the information processing terminal 10 to the target terminal 20 on the basis of the first positional information and the second positional information (S106).

The displayed-position identifier 106 selects a specific object 6 among the general objects 4 and 5 and the specific object 6 included in the see-through image 32 with reference to at least one of the distance and direction to the target terminal 20 (S107).

Figure 9:
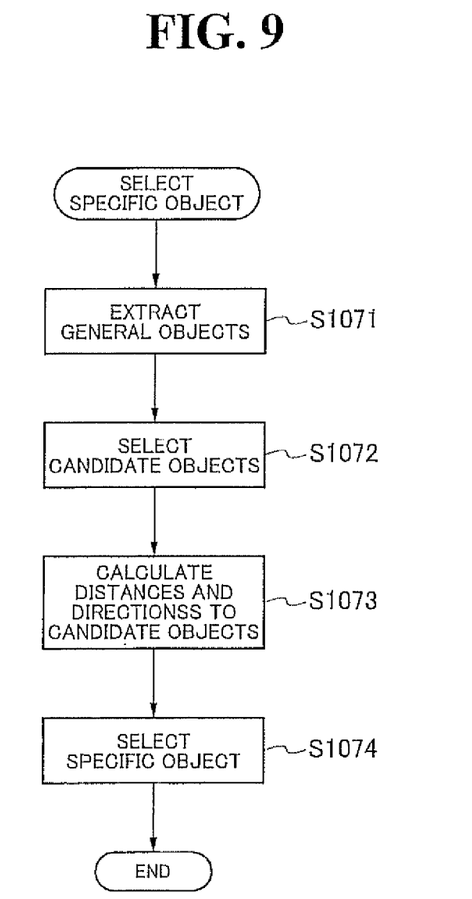
FIG. 9 is a flow chart illustrating the procedure of selecting a specific object in the method of processing information.

FIG. 9 is a flow chart illustrating the process of selecting a specific object. The process of selecting a specific object will now be described with reference to the drawing. The displayed-position identifier 106 extracts general objects included in the see-through image 32 (S1071). An object from the see-through image 32 can be extracted through a known process for extracting predetermined characteristic points.

The displayed-position identifier 106 selects candidates of the specific object 6 (candidate objects) from the extracted objects (S1072).

After selecting the candidate objects, the displayed-position identifier 106 calculates the distances and directions from the information processing terminal 10 to the candidate objects (S1073).

The displayed-position identifier 106 compares the distances and directions to the candidate objects with the distance and the direction from the information processing terminal 10 to the target terminal 20 calculated by the distance and direction acquirer 103 and selects a specific object (S1074).

One of the candidate objects having a distance from the information processing terminal 10 that is substantially the same as the distance L1 and a direction from the information processing terminal 10 that is substantially the same as the direction D1 is selected as a specific object 6.

After selecting a specific object 6, the displayed-position identifier 106 calculates the second distance L2 and the second direction D2 of the selected specific object 6 (S108).

The displayed-position identifier 106 identifies the current position 21 in the current-position image 33, i.e., the current position 21 on the display unit 31 with reference to the second distance L2 and the second direction D2 (S109).

Figure 10:
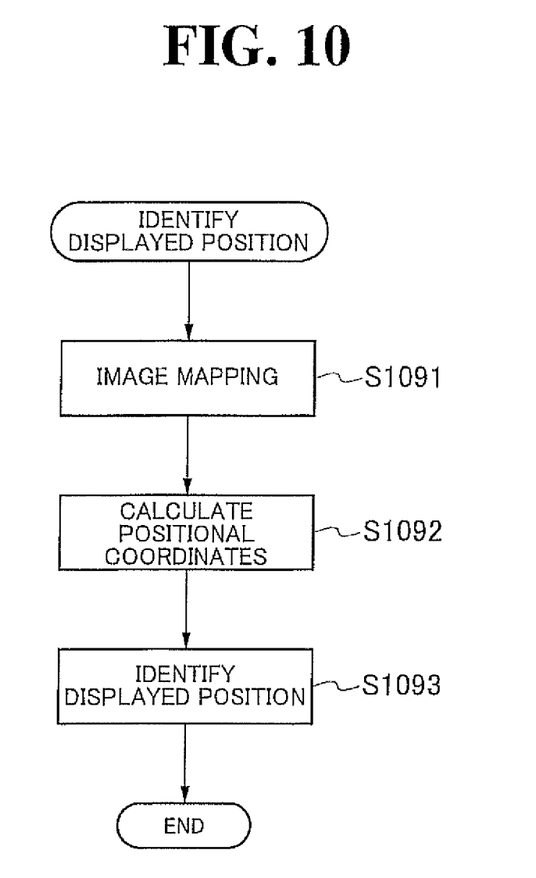
FIG. 10 is a flow chart illustrating the procedure of identifying the displayed position in the method of processing information.

FIG. 10 is a flow chart illustrating the process of identifying the displayed position. The process of identifying the displayed position will be described with reference to the drawing. The displayed-position identifier 106 carries out image mapping to section the see-through image 32 into areas having a predetermined size (S1091).

After the image mapping, the displayed-position identifier 106 calculates the positional coordinates of the target terminal 20 (target 2) near the specific object 6 on the display unit 31 (S1092).

Figure 11:
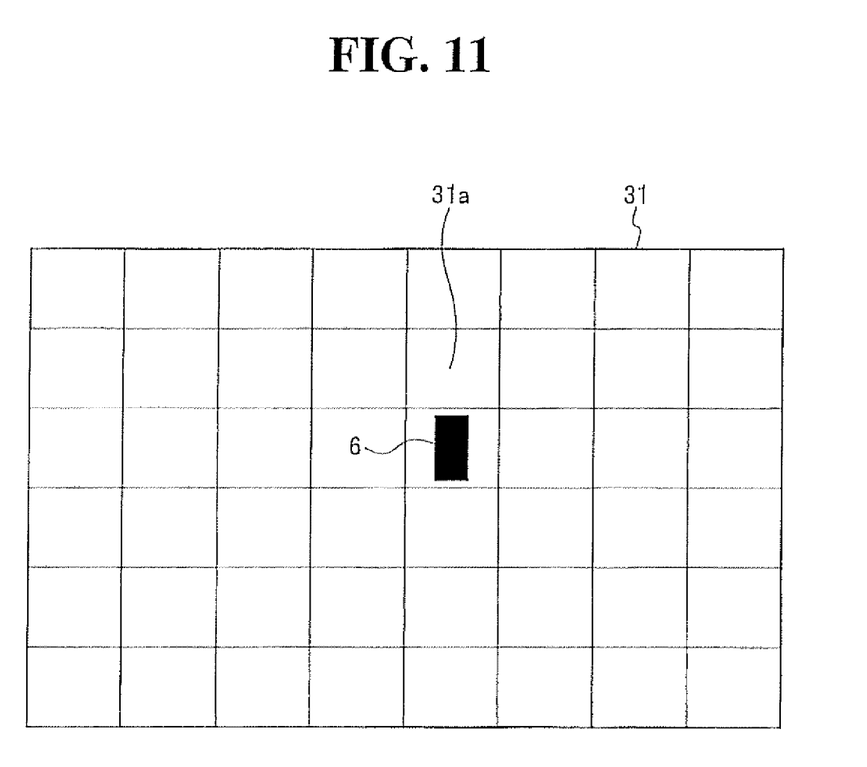
FIG. 11 illustrates the calculation of the positional coordinates in the process of identifying the displayed position.

FIG. 11 illustrates the calculation of the positional coordinates in the process of identifying the displayed position. As illustrated in the drawing, the displayed-position identifier 106 identifies a sectioned area 31a among the sectioned areas on the display unit 31 and calculates the positional coordinates of the identified sectioned area 31a.

The positional coordinates of the target 2 are calculated, for example, with respect to the relationship between the specific object 6 and the target terminal 20, i.e., the difference between the distances L1 and L2 and the difference between the directions D1 and D2.

After the calculation of the positional coordinates, the displayed-position identifier 106 identifies the displayed position of the target terminal 20 (S1093).

After identifying the displayed position of the target terminal 20, the displayed-position identifier 106 sends the identified displayed position to the superposing unit 108.

The superposing unit 108 generates a current-position image 33 including the current position 21 appearing at the identified displayed position and transmits this current-position image 33 to the HMD 30 (S110).

The HMD 30 displays the received current-position image 33 superposed on the see-through image 32 on the display unit 31 (S302).

Figure 12:
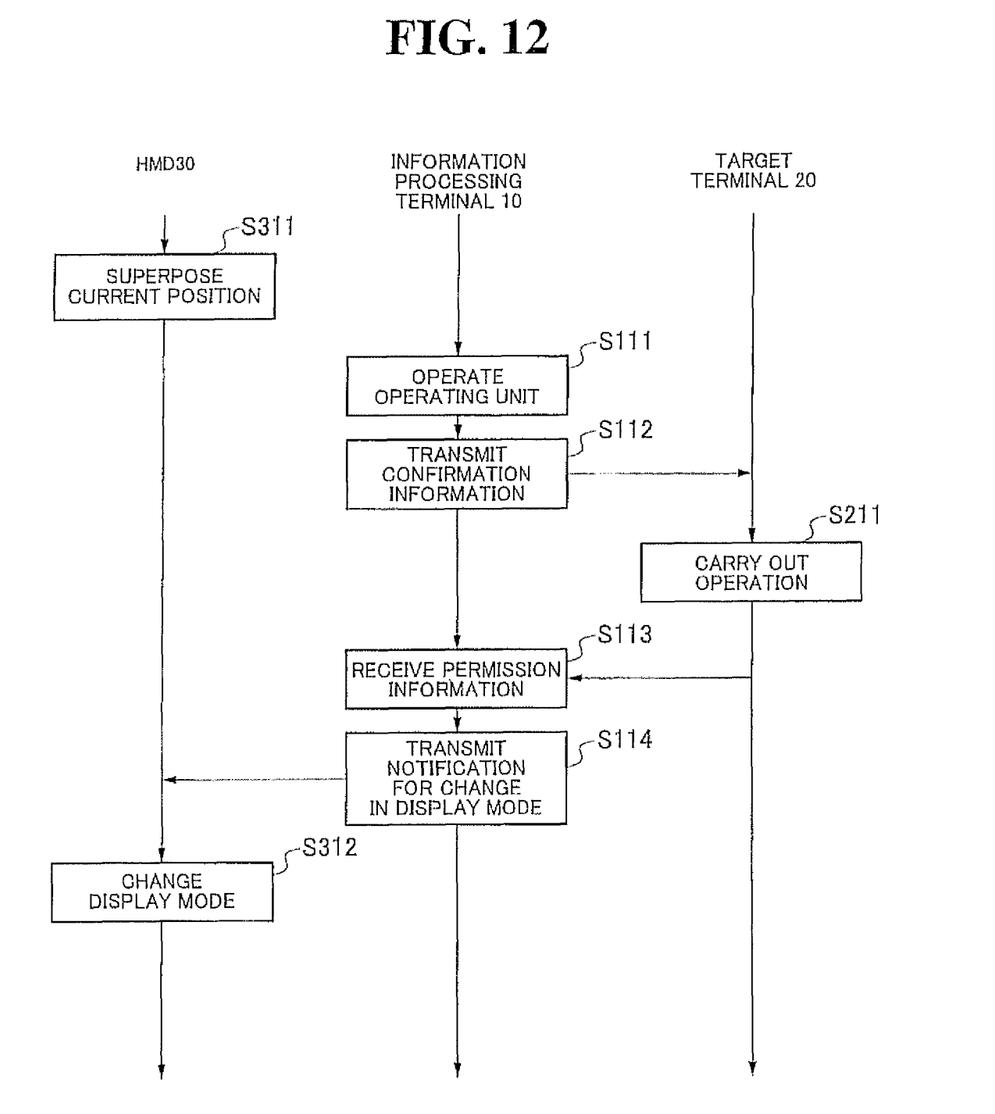
FIG. 12 is a sequence diagram illustrating the display mode selection in the method of processing information.

FIG. 12 is a sequence diagram illustrating the display mode selection in the method of processing information. As illustrated in the drawing, in response to the operation of the operating unit 111 (S111) after the superposition of the current position 21 (S311), the confirmation-information transmitter 110 of the information processing terminal 10 transmits confirmation information (S112).

For example, the transmission of confirmation information from the information processing terminal 10 to the target terminal 20 notifies the target 2 that the searcher 3 has confirmed the position of the target 2.

In response to an operation by the target 2 (S211), the permission-information transmitter 204 of the target terminal 20 that has received the confirmation information sends the permission information to the information processing terminal 10.

For example, through the transmission of the permission information from the target terminal 20 to the information processing terminal 10, the target 2 can notify the searcher 3 of the fact that the target 2 has confirmed that the searcher 3 has specified the position of the target 2.

Upon reception of the permission information by the permission-information receiver 114 (S113), the display-mode selector 109 generates a new current-position image 33 including a current position 21 in a new display mode and transmits a notification for the change in the display mode to the HMD 30 together with the new current-position image 33 (S114).

Display modes can be changed, for example, by changing the color and/or shape of the current position 21 or changing the illumination of the current position 21 from mere lighting to flashing.

Upon reception of the notification for the change in the display mode, the HMD 30 changes the display mode of the current position 21 (S312).

For example, a change in the display mode of the current position 21 can notify the searcher 3 of the fact that the target 2 has confirmed that the searcher 3 has specified the position of the target 2.

The information processing terminal 10 according to the present invention can assist the search for the target 2 carrying a target terminal 20 with a see-through image 32 appearing on the display unit 31 of the HMD 30.

The information processing terminal 10 according to the present invention described above can identify a position with reference to a second distance and a second direction and thus can identify the position of the target terminal 20 in a see-through image 32.

The information processing terminal 10 according to the present invention described above selects a specific object 6 from multiple general objects in a see-through image 32 and thus can provide clues for detecting the target terminal 20 to the searcher 3.

The information processing terminal 10 according to the present invention described above can change the display mode of the current position 21 and thus can inform the searcher 3 about the current condition of the target 2.

In the embodiments described above, a current position 21 is generated in addition to the specific object 6 and is superposed on a see-through image 32.

Alternatively, for example, the specific object 6 may indicate the current position of the target terminal 20. In such a case, the procedures up to the selection of one of the multiple general objects near or at the position of the target terminal 20 in the see-through image 32 as the specific object 6 are the same as those according to the embodiment described above.

Different from the embodiment described above, the information processing terminal 10 generates an image in a display mode that visibly distinguishes the specific object 6 from the other general objects 4 and 5 in the see-through image 32. The information processing terminal 10 uses this distinguished image to indicate the current position instead of the current position 21 according to the embodiment described above.

The information processing terminal 10 displays the current-position image superposed on the see-through image 32 on the display unit 31. As a result, the searcher 3 can detect the target 2 near the specific object 6 appearing in the see-through image 32 on the display unit 31.

What is claimed is:

1. An information processing terminal that displays a current position of a target terminal superposed on a see-through image displayed on a display unit of a translucent head-mounted display, the information processing terminal comprising:
    a distance acquirer processor that acquires a first distance to the target terminal;
    a direction acquirer processor that acquires a first direction to the target terminal;
    a displayed-position identifier processor that identifies positional coordinates for the current position of the target terminal on the display unit based on the first distance and the first direction;
    a superposing unit processor that displays the current position of the target terminal at the positional coordinates superposed on the see-through image on the display unit,
    wherein the displayed-position identifier processor selects a specific object from among a plurality of general objects in the see-through image based on differences in distances between the target terminal and individual objects of the plurality of general objects, each general and specific object being a real world object different from the target terminal, the specific object being selected for reason of being nearest to the target terminal as compared to a remainder of the plurality of general objects, the selection of the specific object visually distinguishing the specific object from the remainder of the plurality of general objects on the display unit so as to convey that the specific object is nearest to the target terminal as compared to a remainder of the plurality of general objects.

2. The information processing terminal according to claim 1, wherein the displayed-position identifier processor selects the specific object from among the plurality of general objects in the see-through image based on at least one of the first distance and the first direction to the target terminal, wherein the displayed-position identifier processor acquires a second distance to the specific object and a second direction to the specific object and identifies the positional coordinates for the current position of the target terminal based on the second distance and the second direction.

3. The information processing terminal according to claim 2, wherein the displayed-position identifier processor selects the specific object from among the plurality of general objects in the see-through image with reference to the first direction to the target terminal.

4. The information processing terminal according to claim 2, wherein the displayed-position identifier processor selects the specific object from among the plurality of general objects in the see-through image with reference to the first distance to the target terminal.

5. The information processing terminal according to claim 2, wherein the displayed-position identifier processor selects the specific object from among the plurality of general objects in the see-through image with reference to the first distance and the first direction to the target terminal.

6. The information processing terminal according to claim 1, wherein the superposing unit processor displays the current position by highlighting the specific object in the see-through image.

7. The information processing terminal according to claim 1, wherein
    the distance acquirer processor acquires the first distance to the target terminal based on positional information of the target terminal and positional information of the see-through head-mounted display, and
    the direction acquirer processor acquires the first direction to the target terminal based on the positional information of the target terminal and the positional information of the see-through head-mounted display.

8. The information processing terminal according to claim 1, further comprising:
    a detector processor that detects the target terminal in the see-through image displayed on the display unit with reference to the first direction; and
    a direction display unit processor that displays a direction to the target terminal with reference to the first direction to the target terminal if the detector processor does not detect the target terminal in the see-through image.

9. A program stored in a non-transitory computer-readable recording medium executable by a computer that displays a current position of a target terminal superposed on a see-through image displayed on a display unit of a translucent head-mounted display, the program comprising steps of:
    acquiring a first distance to the target terminal using said computer;
    acquiring a first direction to the target terminal using said computer;
    identifying positional coordinates for the current position of the target terminal on the display unit based on the first distance and the first direction;

displaying the current position of the target terminal at the positional coordinates superposed on the see-through image on the display unit of the see-through head-mounted display;

selecting a specific object from among a plurality of general objects in the see-through image based on differences in distances between the target terminal and individual objects of the plurality of general objects, each general and specific object being a real world object different from the target terminal, the specific object being selected for reason of being nearest to the target terminal as compared to a remainder of the plurality of general objects; and visually distinguishing the specific object from the remainder of the plurality of general objects on the display unit of the translucent head-mounted display so as to convey that the specific object is nearest to the target terminal as compared to a remainder of the plurality of general objects.

10. The information processing terminal according to claim 1, further comprising:

a display-mode selector that changes a display mode of the current position displayed on the display unit, the display-mode selector changing the display mode in response to a change in the first distance to the target terminal during display of the current position on the display unit.

11. The program of claim 9, further comprising a step of changing a display mode of the current position displayed on the display unit in response to a change in the first distance to the target terminal during display of the current position on the display unit.

\* \* \* \* \*